United States Patent [19]
Gopinath et al.

[11] Patent Number: 4,899,143
[45] Date of Patent: Feb. 6, 1990

[54] HIGH CAPACITY COMMUNICATION SYSTEM OVER COLLISION-TYPE CHANNELS

[75] Inventors: Bhaskarpillai Gopinath, Berkeley Heights; Shuo-Yen R. Li, Gillette, both of N.J.

[73] Assignee: Bell Communications Research, Inc., Livingston, N.J.

[21] Appl. No.: 184,509

[22] Filed: Apr. 21, 1988

[51] Int. Cl.$^4$ .......................... H04Q 1/20; H04Q 1/30
[52] U.S. Cl. ............................ 340/825.5; 340/825.51
[58] Field of Search ........................ 340/825.5, 825.51; 370/85, 89

[56] References Cited

U.S. PATENT DOCUMENTS

| | | | |
|---|---|---|---|
| 3,796,992 | 3/1974 | Nakamura et al. | 340/147 |
| 4,281,380 | 7/1981 | DeMesa, III et al. | 364/200 |
| 4,359,731 | 11/1982 | Beauford et al. | 340/825.51 |
| 4,376,278 | 3/1983 | Jacobsthal | 340/825.5 |
| 4,470,110 | 9/1984 | Chiarottino et al. | 364/200 |
| 4,476,467 | 10/1984 | Terwilliger et al. | 340/825.5 |
| 4,481,626 | 11/1984 | Boggs et al. | 379/85 |
| 4,623,886 | 11/1986 | Livington | 340/825.5 |
| 4,796,023 | 1/1989 | King | 340/825.51 |

FOREIGN PATENT DOCUMENTS 1365838  9/1974  United Kingdom.

*Primary Examiner*—Ulysses Weldon
*Attorney, Agent, or Firm*—James W. Falk; John T. Peoples

[57] ABSTRACT

A methodology is disclosed for effecting contention-free communication over a plurality of Collision-type lines interconnecting numerous synchronized stations. In broad terms, each station having a message to transmit executes a prescribed encoding/algorithm. Each station also monitors the states of the lines and depending upon the dynamic states of the lines, the lines are associated with prescribed ones of the lines during each bit interval. At any stage of the detection process, if it is determined that a line broadcasts of unique message, then this line is assigned to the station generating the unique message for the remainder of the frame. The remaining lines are then available for reassignment in subsequent bit intervals. The pattern of bits detected at the end of the frame by each of the lines determines successfully transmitted messages.

7 Claims, 6 Drawing Sheets

FIG. 2

| STATION | \multicolumn{8}{c}{FRAME BITS} |
|---------|---|---|---|---|---|---|---|---|
|         | 1 | 2 | 3 | 4 | 5 | 6 | 7 | 8 |
| $S_1$   | 0 | 0 | 0 | 1 | 1 | 0 | 1 | 0 |
| $S_2$   | 0 | 0 | 1 | 0 | 0 | 0 | 1 | 0 |
| $S_3$   | 0 | 1 | 0 | 0 | 0 | 1 | 0 | 0 |
| $S_4$   | 0 | 1 | 0 | 0 | 0 | 1 | 0 | 1 |
| $S_5$   | 0 | 1 | 0 | 0 | 0 | 1 | 1 | 1 |
| $S_6$   | 0 | 1 | 0 | 0 | 0 | 1 | 1 | 1 |
| $S_7$   | 0 | 1 | 0 | 0 | 1 | 0 | 0 | 1 |
| $S_8$   | 0 | 1 | 0 | 1 | 1 | 0 | 1 | 0 |
| $S_9$   | 1 | 0 | 1 | 1 | 0 | 1 | 1 | 0 |
| $S_{10}$| 1 | 1 | 1 | 0 | 1 | 1 | 1 | 0 |
| $S_{11}$| 1 | 1 | 1 | 0 | 1 | 1 | 1 | 0 |
| $S_{12}$| 1 | 1 | 1 | 0 | 1 | 1 | 1 | 0 |
| $S_{13}$| 1 | 1 | 1 | 0 | 1 | 1 | 1 | 1 |

FIG. 4

HIGH CAPACITY COMMUNICATION SYSTEM OVER COLLISION-TYPE CHANNELS

CROSS REFERENCE TO RELATED APPLICATION

The following U.S. application, which is assigned to the same assignee as the instant application and which is filed concurrently therewith, contains related subject matter: "High Capacity Communication System Using OR-type Channels", Ser. No. 184,331, S.-Y. R. Li (Case 2).

FIELD OF THE INVENTION

This invention relates generally to a multiple access communication network wherein a plurality of transmission channels interconnect numerous distributed stations and, more specifically, to a methodology and associated systems for effecting high capacity and low delay interstation communication over Collision-type channels.

BACKGROUND OF THE INVENTION

A conventional configuration for a communication network is one wherein a plurality of stations are interconnected by a common transmission medium or channel, and messages are exchanged among the stations on a timeshared basis over the channel. A so-called conflict situation arises whenever multiple stations require use of the channel at the same instant.

For these contention periods, methods and concomitant arrangements exist for dealing with conflicts and these vary in complexity from simple, fixed priority techniques to sophisticated code division multiple access procedures. When the stations are arranged to sense a conflict on the channel, the type of communication network is referred to as a Carrier Sensed Multiple Access (CSMA) network.

As a specific example illustrative of the art for arbitrating contentions in a CSMA environment, the CSMA with Collision Detection (CSMA/CD) media access method is briefly described. (The CSMA/CD method is discussed in detail in the text entitled "Carrier Sensed Multiple Access with Collision Detection (CSMA/CD) Access Method and Physical Layer Specifications", published by The Institute of Electrical and Electronic Engineers, Inc. in 1985). To transmit, each station monitors for a quiet period on the channel by detecting that no other stations are transmitting, and then emits the intended message in bit-serial form. If, after commencing transmission, the message collides with that of other stations, then each transmitting station intentionally sends additional bits to ensure propagation of the collision throughout the system. The stations then deactivate for a random time period, called the backoff time, before attempting to transmit again. This process continues until only a single message propagates collision-free over the channel. However, as is quite discernible even from this brief overview, this technique is somewhat inefficient due to station deactivation during the backoff periods and the random nature of the retry process. From another viewpoint, if a normalized efficiency per transmission period is defined as the ratio of the time utilized for information-bearing message transfer to the total time period, then the efficiency is less than unity for conventional contention resolving systems.

Other, more specialized techniques have been disclosed to deal with contention on a more deterministic basis. Representative of these techniques is the disclosure in Great Britain Patent No. 1,365,838. In this reference, the particular system considered is one in which a number of data handling devices (slave stations) are in communication with a common controller (master station) over a bus and any one of the devices may require service from the controller at any given time. At system initialization, each data handling device is assigned a fixed interrupt number indicative of the device address. The controller solicits interrupt requests by transmitting a coded message. Each device, if requesting use of the bus, responds by serially transmitting its interrupt number simultaneously with other devices. Then each device compares the bus content bit-by-bit and then either terminates or continues its transmission according to the results of the comparison. With such a technique, the time required to resolve a contention is fixed by the number of bits assigned to the interrupt numbers. However, even though this time is deterministic, there is still a period in which no actual information-bearing messages may be transmitted and the normalized efficiency is less than one.

As suggested by the above discussion, there have been many protocols introduced for dealing with conflicts in CSMA networks, and there have been numerous studies of their performance. With an offered load equal to the channel capacity, the throughput efficiency of all previous protocols is no more than 70 percent. Moreover, when the offered load exceeds a certain level in a given system, an overload condition referred to as "jamming" occurs, and the efficiency drops off, often significantly, above this threshold level.

None of the conventional techniques disclose or suggest a methodology for always achieving the optimum normalized throughput efficiency as defined above. Moreover, none of the conventional methods suggest the utilization of more than one channel or bus to resolve or even eliminate contention situations.

SUMMARY OF THE INVENTION

The above disadvantages and other limitations of conventional contention resolution methods and arrangements are obviated, in accordance with the present invention, by interconnecting all stations with a plurality of Collision-type channels or lines and by arranging each of the stations to monitor the states of all lines dynamically and appropriately to determine the response in correspondence to the dynamic states. Briefly, for station messages partitioned into a number of bit intervals, the general method for a given bit interval commences by assigning available lines to corresponding ones of the stations and then broadcasting a logic signal by the stations over an appropriate one of its assigned lines as determined by the bit in the given interval. The composite signal on each of the lines is detected, and any line having a unique message is assigned to the station propagating the unique message for the remaining bit intervals. The other lines are then available for subsequent reassignment in the succeeding bit interval. The composite signal on each of the lines for each of the bit intervals after all bits have been transmitted is an indicator of successfully transmitted messages.

The organization and operation of the invention will be better understood from a consideration of the detailed description of the illustrative embodiments thereof, which follow, when taken in conjunction with the accompanying drawing.

BRIEF DESCRIPTION OF THE DRAWING

FIG. 2 depicts an exemplary set of messages from a single frame prepared for propagation over the plurality of lines shown in FIG. 1;

FIG. 4 summarizes the various phases of the transmission process for the various bit positions in the given frame for the exemplary messages of FIG. 2 broadcast over nine lines.

DETAILED DESCRIPTION

Figure 1:
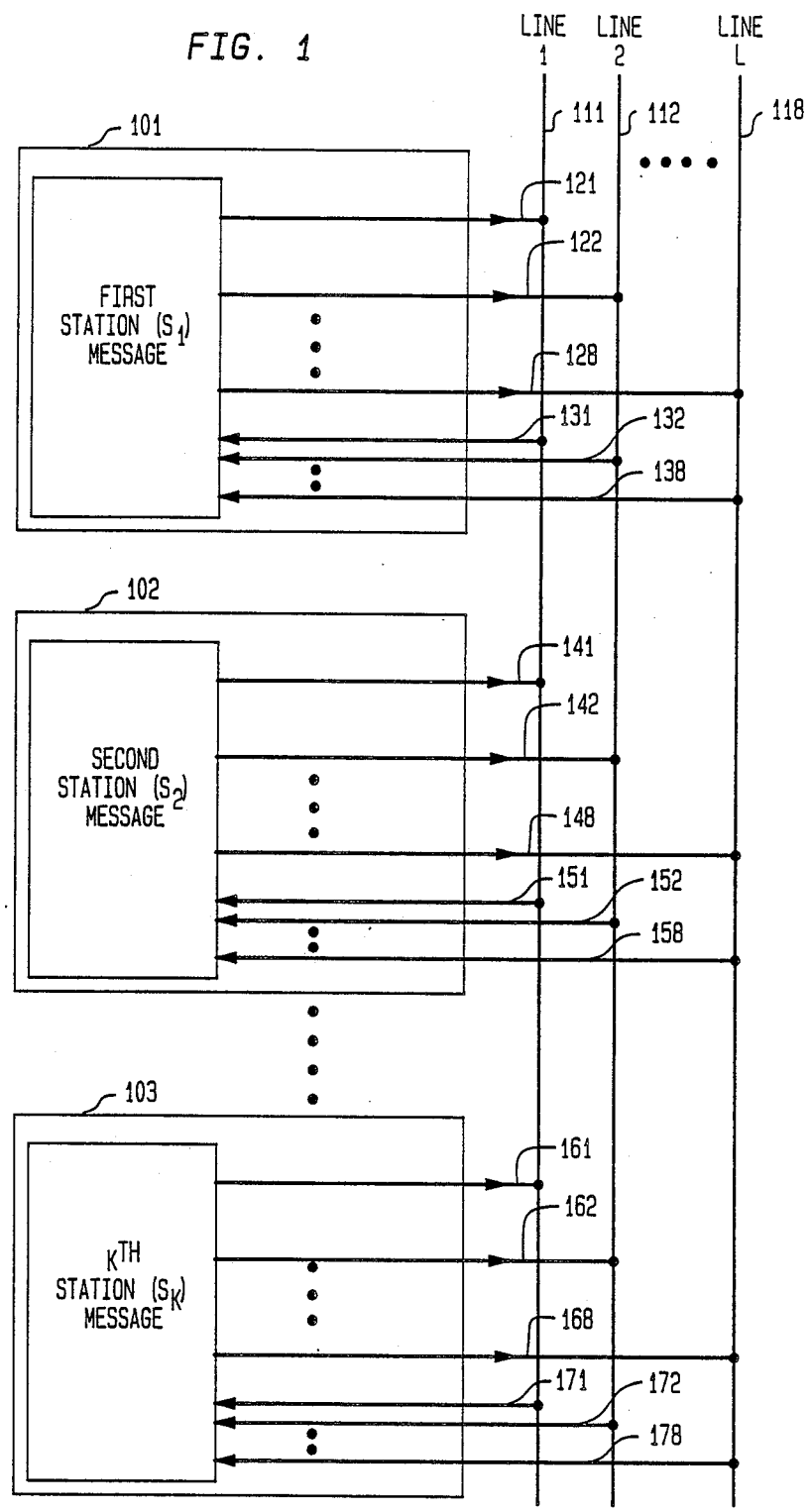
FIG. 1 is a representation of a multiple access communication system wherein a plurality of Collision-type lines interconnect numerous, geographically-dispersed stations.

An illustrative embodiment in accordance with the present invention may be represented in general form by the block diagram of FIG. 1. As indicated, there are generally K stations coupled to L lines. The stations and lines are arranged to support so-called Collision propagation on the lines, that is, two or more logic 1 signals on a given line result in a combined level of logic 2. (The term "Collision" used in this sense differs from the term as used in the Background section with reference to CSMA. From this point on, the term refers to the definition just provided.) Otherwise, a line provides a logic 0 when no signals are present and a logic 1 level when one and only one logic 1 signal is broadcast by any of the stations. Hereafter, a Collision-type line will be simply called a line. For a general background on how the lines may be arranged to effect parallel, Collision-type communication, the article entitled "Performance Comparison of Explicit and Implicit Token-Passing Networks," by O. C. Ibe as published in *Performance*, Vol. 10, No. 2, April, 1987 is incorporated herein by reference.

To facilitate the description of the principles of this invention, a degree of specificity is utilized without sacrificing generality. Thus, thirteen stations $S_1-S_{13}$ are coupled to eight lines 111–118, that is, $K=13$ and $L=8$, so that $S_1$ corresponds to element 101 and transmits on lines 121–128 and receives on lines 131–138, whereas $S_{13}$ ($S_K$ generally) corresponds to element 103 with its associated transmit and receive lines. Each station communicates via eight-bit message frames; an exemplary set of frames for the stations is shown in FIG. 2. To demonstrate succinctly the message transmission process, the messages are arranged in ascending order corresponding to the binary values and the stations are numbered accordingly; this simplifies notation but is not required. It is observed that stations $S_5$ and $S_6$ have identical messages to broadcast; similarly, stations $S_{10}-S_{12}$ are prepared to transmit the same message.

Broadly, the transmission process commences with a determination within each station of the binary value of the N most significant bits from the message frame to be transmitted. The value of N is predetermined, and it is the largest integer satisfying $2^N \leq L$. In this case, since $L=8$, then $N=3$.

As the next step to the process, since each station has a message to transmit, each station broadcasts a logic 1 signal on the line corresponding to the binary value of the first N bits. In this case, station $S^1$ transmits a sense signal on line 111 which is assigned the initial prefix '000', $S_2$ transmits a sense signal on line 112 which is assigned the initial prefix '001', $S_3-S_8$ all place a logic 1 sense signal on the next line, and so forth. For this particular frame message set, lines 114, 115 and 117, which are assigned prefixes '011', '100' and '110', respectively, are not activated initially. A prefix is a partial message and the size of the prefix is determined by the bit interval under consideration.

Figure 3:
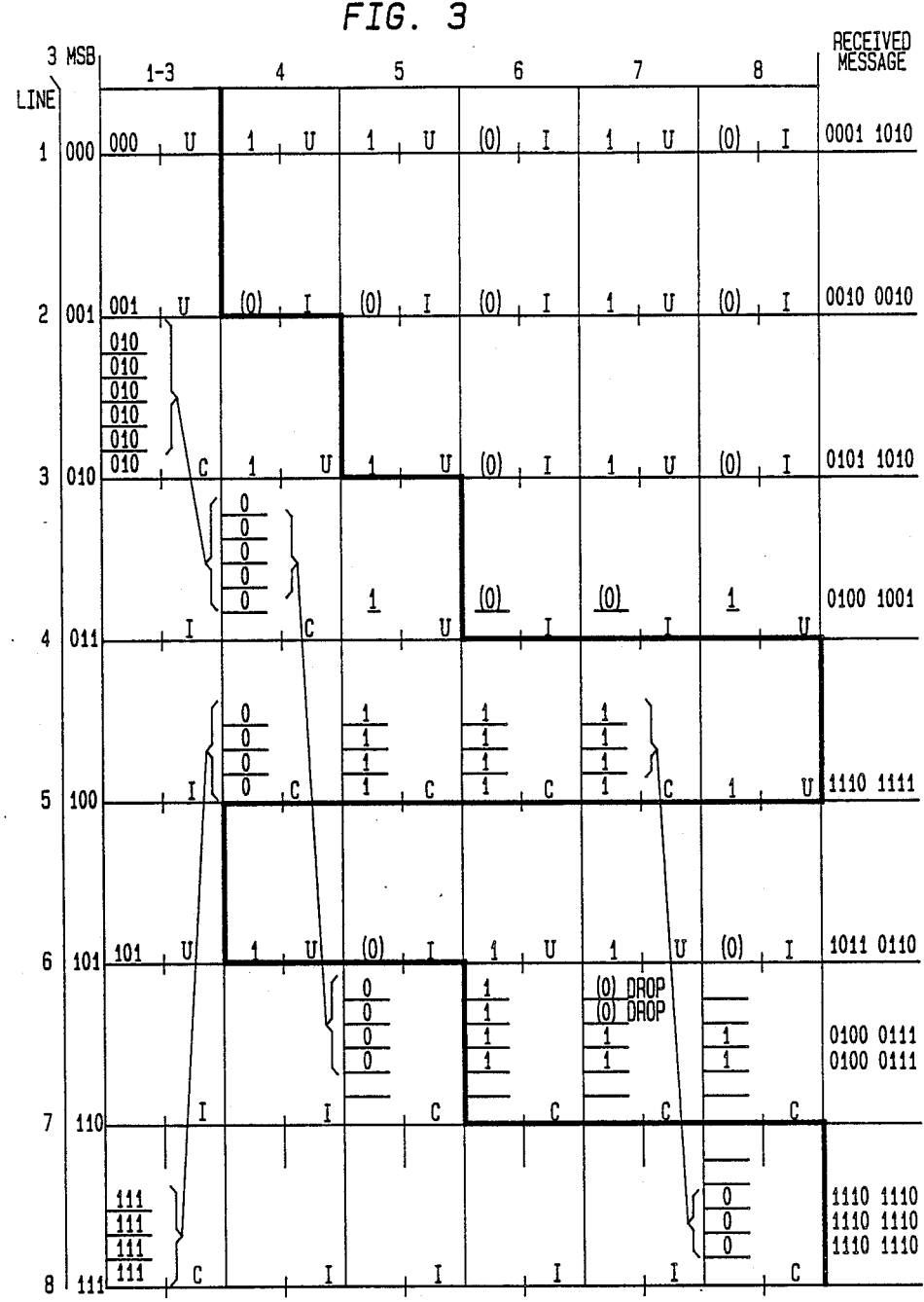
FIG. 3 summarizes the various phases of the transmission process for the various bit positions in the given frame for the exemplary messages of FIG. 2 broadcast over eight lines.

A pictorial description of these two transmission steps for the first N bits is presented as a portion of FIG. 3; moreover, this figure summarizes the process for the remaining bits, as discussed shortly. The left column lists, for reference purposes, the individual transmission lines now relabeled 1 through 8 for convenience. The second column lists all possible binary values of the three (N) most significant bits of each message and the initial association or identification of each binary value to the corresponding line. For instance, a binary "011" is associated with line 4.

The third column is actually subdivided into two portions as separated by vertical hash marks. The left-hand portion depicts, in the vertical dimension for each of the eight lines, the actual message or messages associated with the corresponding line, in ascending order of binary values. A tabulation of the number of messages for each line provides an indication of the cumulative sense signal level on that line. For a "collision" system, two or more logic 1 signals on a line result in a collision, that is, a combined signal level of logic 2. Thus, for instance, line 1 is excited with one logic 1 signal so there is no collision, but line 3 is excited with six signals resulting in a collision.

The right-hand subdivision of the third column for each line 1,2, . . . ,8 indicates that one of three possible results, namely, U (Unique), C (Collison) or I (Idle), is detected within each station $S_1, S_2, \ldots, S_{13}$ from monitoring the signal strength on the separate lines. For example, line 1 has a logic 1 signal level meaning that one and only one station ($S_1$ in this case) has broadcast on that line. Only station $S_1$ continues propagation on this line and it is marked with a "U" status implying the line is busy and a unique message will be revealed at the end of the frame. Similarly, line 2 is marked "U" and is reserved for station $S_2$ whereas line 6 is marked "U" and is reserved for station $S_9$.

Lines 3 and 8 have a "C" status since six and four logic 1 signal levels, respectively, were broadcast on these lines. Collisions may be resolved later in frame as subsequent bits in the broadcast stream are emitted.

Finally, lines 4, 5 and 7 are marked with an "I" status by each station since no station broadcast on these lines so a logic 0 is detected on these lines. The lines may be used later in the frame message, as required.

This completes the description of the initial phase of the process, that is, the transmission procedure for the N most significant bits. At the end of this phase, each line is marked with the appropriate initial status and each station has made an independent determination of the status by monitoring on its respective receive lines.

The next phase, called the reassignment phase, begins at the N+1 bit (bit 4 in this case). To convey the unfolding transmission process during this reassignment phase, a new terminology is introduced. A line is said to be either Open or Taken, and initially all lines are Open. Then, once Taken, a line is always Taken. In this way, the Open or Taken status is permanently associated with the line, while the "I", "U" or "C" status reflects the result of bit-by-bit transmission. To convert lines having a "I", "U" or "C" status to Open or Taken, the following procedure is used. If a line has an "I" status at the end of a bit interval, it remains Open. If a line has a "U" status, it becomes Taken. If a line has a "C" status, then whether it is Open or Taken depends on a notion called "matching".

At the end of a bit interval, Open "C" lines are paired with Open "I" lines in top-down order. It is possible that the former may outnumber the latter or, vice versa and therefore some "C" lines or "I" lines are not matched. With the matching notion now defined, a line with a "C" status, if matched, is designated as Open; otherwise, if unmatched, the line becomes Taken. If a "C" line is matched with an "I" line, then a message sender enters a logic 1 level on the "C" line if the next bit from a station is a logic 1; otherwise, the sender enters a logic 1 level on the matching "I" line if the next bit from the station is a logic 0. If an "I" line is unmatched, no station writes a logic 1 level on this line and therefore the "I" status remains unchanged.

With regard to a Taken line, a message sender enters a logic 0 or 1 according to its next message bit. Upon monitoring its assigned line, if an "I" status is sensed, then the level is decoded as a logic 0. If either a "U" or "C" status is obtained, then the level is decoded as a logic 1. If a message sender enters a logic 0 and senses either a "U" or "C" status on read back, the corresponding message is dropped.

Applying these principles to the example, again with reference to FIG. 3, those lines that have been marked as Taken are delineated by the generally vertical bold line. Thus, after the initial phase, lines 1, 2 and 6 are Taken since they have a "U" status. When matching is performed, lines 3 and 4 form one matched pair whereas lines 8 and 5 form a second matched pair.

Once a line is marked as Taken, it will carry a unique message as the remaining bits are propagated. For instance, line 1 of FIG. 3 is Taken at the end of bit interval 3, so the logic 1 level in the fourth bit position (column 4), the logic 1 in the fifth position, the logic 0 in the sixth position, and so forth, produces message '00011010' as the output of line 1 at the end of the frame interval. In general in FIG. 3, a '0', '(0)' or '1' bit shown in the left hand portion of a bit interval for bits 4 through 8 reflects message propagation only on Taken lines. A '0' or '1' bit indicates a logic 1 level has been entered by a message whose new bit is '0' or '1', respectively. A '(0)' bit indicates a logic 0 level.

The focus of the remaining discussion is on the "C" or "I" lines since the algorithm is not as straightforward as for Taken lines. With respect to the fourth bit interval, for the stations associated with the first matched pair of lines, namely lines 3 and 4, five stations have a bit 0 in the fourth bit position whereas the sixth station has a bit 1. According to the procedure, the five stations all propagate a logic 1 on the matched "I"line, namely, line 4, whereas the sixth station propagates a logic 1 on the "C" line, namely, line 3. Because of the logic 1 level on line 3, its status is "U" and, in turn, it is marked as Taken. On line 4, the five logic 1 signals result in a collision, so line 4 is marked with a "C" status. With respect to the other matched pair, namely lines 8 and 5, the four stations giving rise to the collision each have a bit 0 to in bit interval 4. This results in a "C" status, on line 5, whereas line 8 is labeled as "I" because no message propagation occurs during this bit interval over line 8.

In preparation for the fifth bit interval, line 4 is matched to line 7 and line 5 is matched to line 8. All these four lines remain Open. Now, for the first matched pair, four of the stations have a bit 0 to broadcast in the fifth bit interval resulting in a collision on line 7. The fifth station propagates its logic 1 on line 4 thereby resulting in a "U" status being given to line 4. Line 4 thus becomes Taken. For the second matched pair, since all stations have a logic 1 to transmit, line 5 results in a "C" status and line 8 is marked as "I".

In preparation for the sixth bit interval, lines 5 and 8 are matched, but line 7 is unmatched so it becomes Taken. The four stations associated with line 5 all have a logic 1 to transmit, resulting again in a collision on line 5. Line 8 remains idle. The four stations assigned to line 7 all have a logic 1 to broadcast, thereby resulting in another collision on line 7.

Before the beginning of the seventh bit interval, lines 5 and 8 are matched. The four stations associated with line 5 all have a logic 1 to transmit, resulting again in a collision on Line 5. Line 8 remains idle. On line 7, two stations write a logic 1, so the two stations having a logic 0 as their seventh bit drop out of contention. However, line 7 is again marked as "C" because of the two logic 1 signals.

Before the beginning of the last bit interval, lines 5 and 8 are again matched. Now, three of the stations have a bit 0 to transmit, and this condition results in a collision on line 8. One of the stations associated with line 5 has a logic 1 to write on line 5 thereby rendering line 5 as a "U" status line. The collision on line 8 results in an unmatched condition, so line 8 is marked as Taken. Finally, line 7 registers a logic 1 in the last bit position since the two remaining stations have logic 1 levels to broadcast, resulting in a "C" status.

It is observed that all lines are fully utilized and, in fact, eleven of the thirteen stations communicated eight different messages within the frame time period.

In this example, N and L were such that in the relationship $2^N \leq L$, equality was achieved. In general, when L is not a power of 2, then $2^N < L$. For instance, if L=9, then N=3 also applies. Since the three most significant bits map to only eight unique binary values, no signal levels would excite the ninth line in the initial phase. At the end of the initial phase, this extra line would naturally be marked with an "I" status and the reassignment phase would commence.

Figure 4:
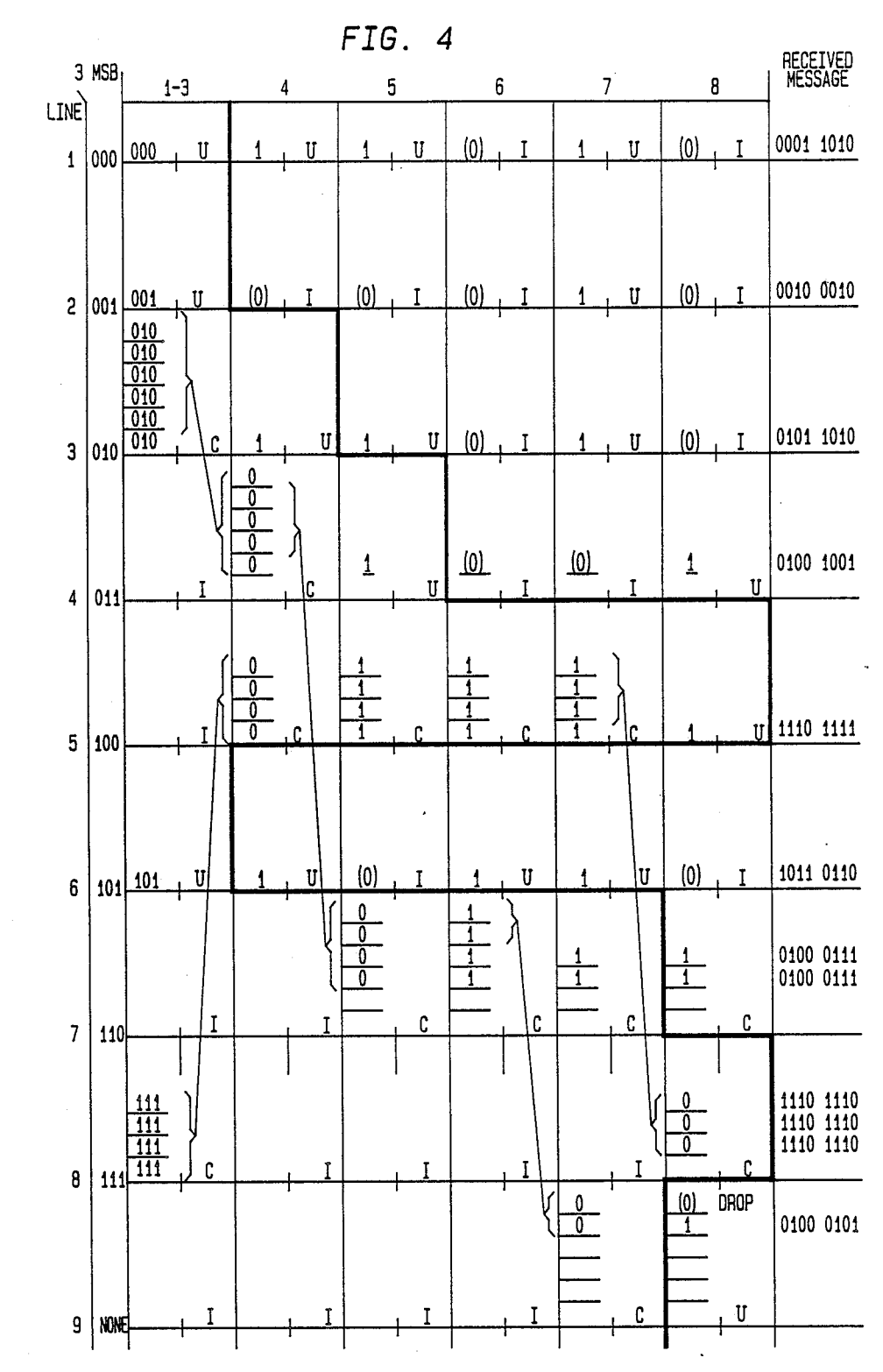

When the algorithm is applied to the transmission of the thirteen messages in FIG. 2 on nine lines, the result is summarized in FIG. 4. Thus, twelve stations send nine distinct messages.

Process Flow Diagrams

The Encoding Perspective of the Algorithm

At each bit time interval, a transmitting station is assigned to a line for entering a proper signal. Initially, at the beginning of bit interval N, the line assignment is according to the N-bit prefix of the intended message of the station.

Through the first N bits, each line is an Open line. Thereafter, depending upon the read "U", "C", or "I" logic level of all lines, this Open line may or may not become Taken, as elucidated in the above described procedure. If it does become Taken, then the station will be statically assigned to the same line until either the end of the transmission frame or the message is dropped. On the other hand if the line remains Open, then the line status must be "C" and it must be matched with an "I" line according to the top-down matching procedure. Then there are two possibilities in the line assignment for the next bit interval depending upon the next bit of the intended message. If the next bit is a '1', the station remains assigned to the same line. If it is a '0', the station is switched to the matched "I" line.

When the assigned line is Taken, the station enters a logic level according to the next bit in its intended message. If a logic level 0 is entered but a "U" or "C" status results, the transmission is aborted. Otherwise, the transmission proceeds.

When the assigned line is Open, the station enters a logic 1 level regardless of the next bit and the transmission proceeds.

Figure 5:
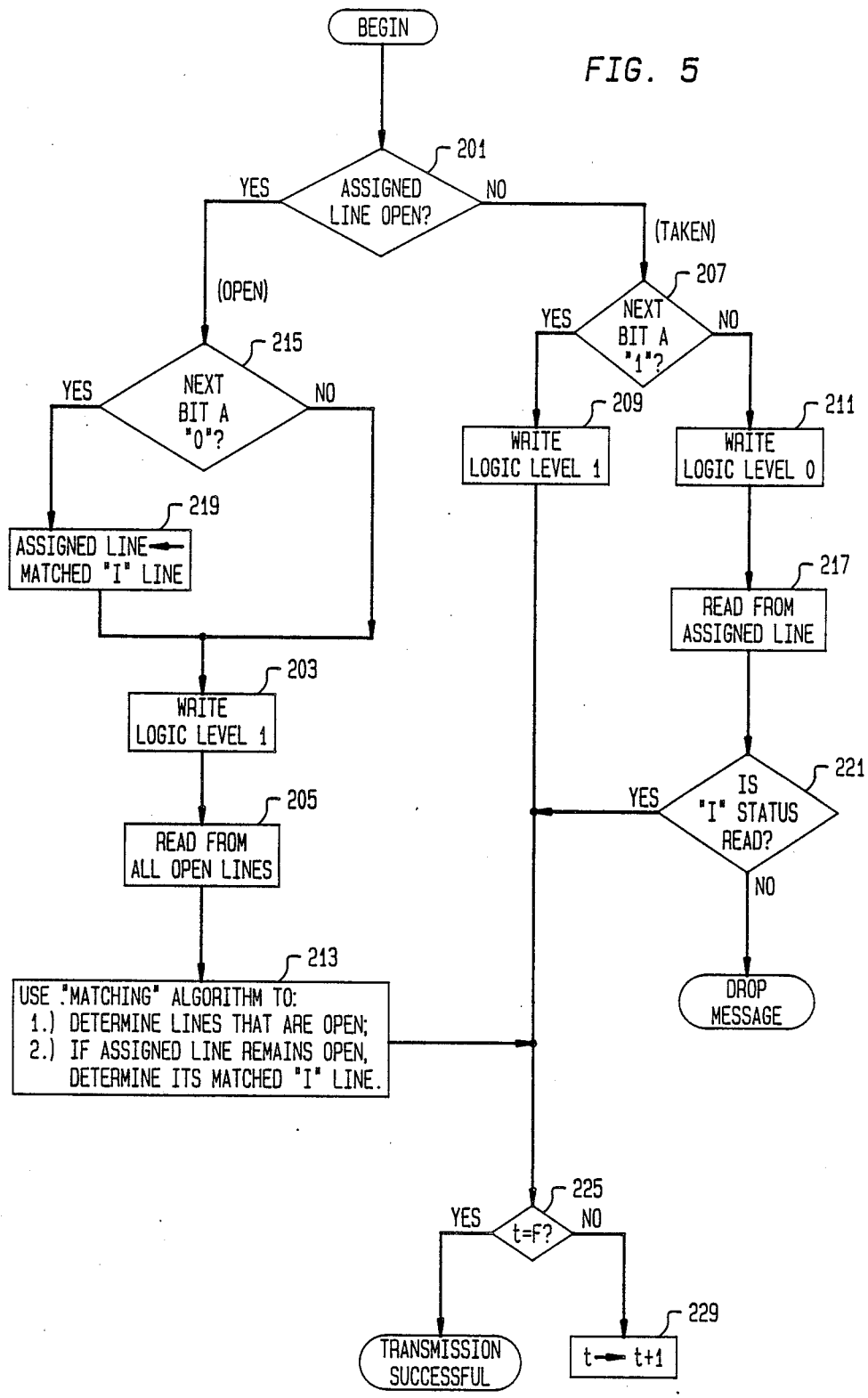
FIGS. 5 and 6 are block diagrams of the encoding and decoding algorithms, respectively.

FIG. 5 is the general flow chart of the encoding procedure in a typical bit interval t in the reassignment phase. The processing begins with decision process 201, which determines if the assigned line is Open. If the assigned line is Open, then the processing by decision block 215 is invoked to determine if the next bit is a logic zero. If it is a logic zero bit, then the matched "I"line becomes the new assignment, as depicted by processing block 219. Upon exiting block 219, a logic one level is propagated on the appropriate line; this is depicted by block 203. If the next bit is not a logic zero, then processing block 203 is entered directly. Following the write step of processing block 203, all Open lines are read via the processing by block 205. As then depicted by processing block 213, the "matching" algorithm is employed to determine all lines that are Open; if the assigned line remains Open, then a determination is made of its matched "I" line. Decision block 225 is then entered. If the last bit of a message frame has been processed then the transmission is successful. Otherwise a new bit is processed as depicted by block 229.

Returning to the 'No' leg from decision process 201, the next step is to enter decision block 207 to determine if the next bit is a logic 1. If so, a logic 1 is written on the assigned line as represented by block 209. After this write step, decision processing block 225 is entered. If the result of the decision in block 207 yields a 'No' output, then processing block 211 is invoked to write a logic 0 on the assigned line. This is immediately followed by a read step from the assigned line as depicted by processing block 217. If an "I" status is read, as shown by decision block 221, then block 225 is entered. Otherwise, the message is dropped.

The Decoding Perspective of the Algorithm

During the transmission process, all station messages assigned to a common line at the end of bit interval t share a common t-bit prefix. Thus each line is either assigned to a unique prefix or none. The decoding function keeps track of the prefix associated with each assigned line. At the end of bit interval F, the F-bit prefix associated with a Taken, Open "U", or Open "C" line is a successfully transmitted message. For decoding, a memory table comprising L entries is maintained by each station, with each entry corresponding to a line. Every entry contains one Open/Taken status bit and F data bits. The data bits store the prefix associated with the corresponding line, providing it is an assigned line.

Initially each of the first $2^N$ lines stores an N-bit prefix, while other lines are not associated with prefixes. Meanwhile, all lines have the Open status. The contents of the table are updated through every bit interval t ($t < F$) as now described.

If a line is Taken or if a "U" or "C" logic level is read from the line, then that line must be associated with some prefix. The matching procedure pairs Open "C" with Open "I" lines. Then the status of all Open "U" lines and unmatched Open "C" lines is changed into Taken. The Open/Taken status of all other lines is unchanged. A '1' bit is appended to the prefix associated with any "U" or "C" line which is currently Taken. A '0' bit is appended to the prefix associated with any Taken "I" line. For each matched pair, the t-bit prefix of the "C" line plus a '0' bit becomes the prefix associated with the "I" line; meanwhile a '1' bit is appended to the prefix of this "C" line itself.

Figure 6:
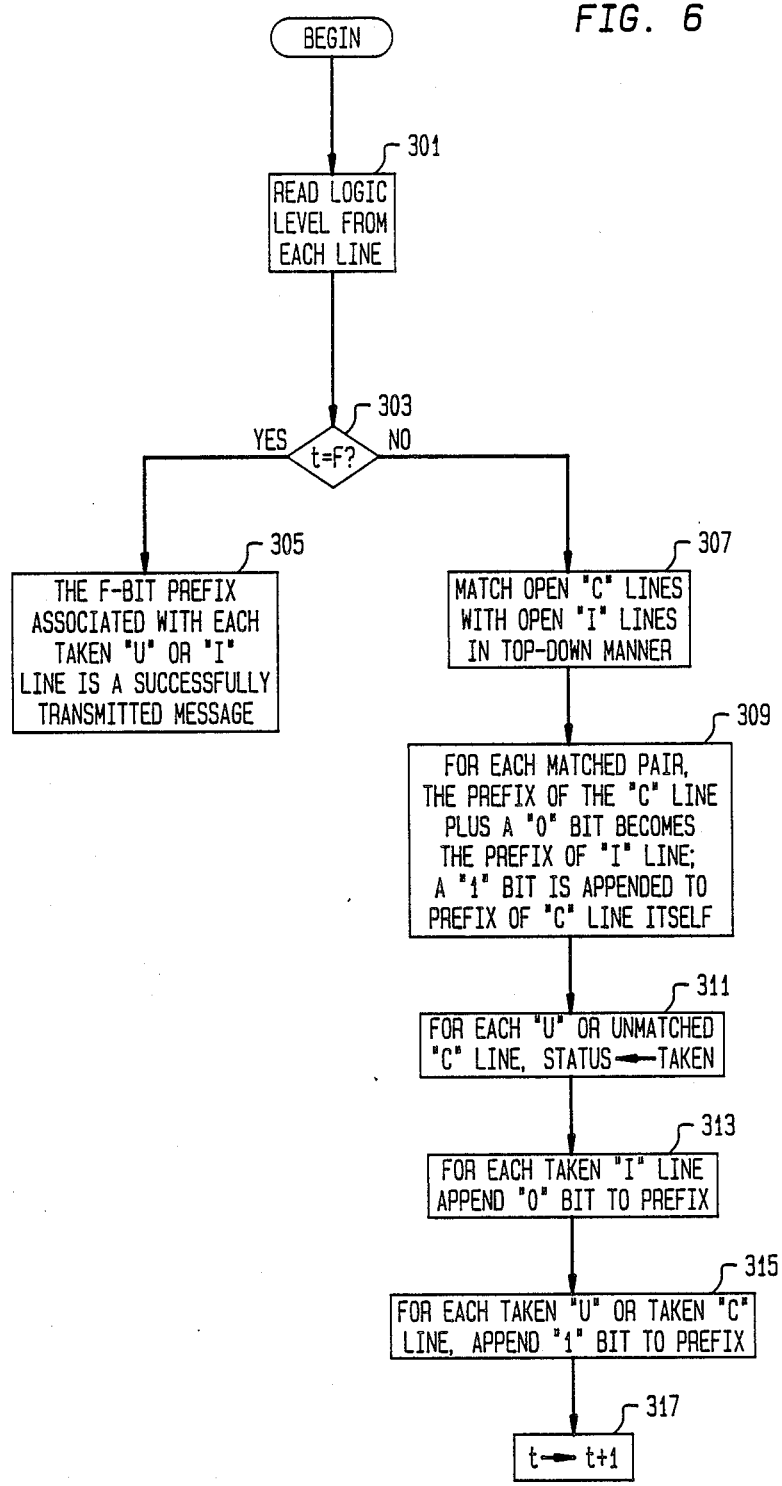

FIG. 6 is a flow chart of the decoding procedure in a typical bit interval. The processing begins by invoking processor block 301 to read the logic level from each line. If the last bit has been processed, as determined by decision block 303, then the F-bit prefix on Taken "U" or "I" status lines represents a successfully transmitted message. If other bits remain to be processed, then processing block 307 is entered. In this processing step, open "C" and "I" lines are matched in top-down fashion. This leads to the processing depicted by block 309. For each matched pair, the table is filled in such a way that the prefix of the "C" line plus a '0' bit becomes the new prefix of the matching "I" line whereas a '1' bit is appended to the table entry associated with the "C" line itself. To handle the "U" lines or unmatched "C" lines, processing block 311 is entered to mark the status of the corresponding lines as Taken. As then indicated by block 313, each Taken "I" line results in a '0' bit entry to the prefix in the table. On the other hand as depicted by block 315, for each Taken "U" or Taken "C" line, a '1' bit is appended to the appropriate table entry. Block 317 then updated the bit interval for continued processing.

It is to be understood that the above-identified arrangements are simply illustrative of the application of the principles in accordance with the present invention. Other arrangements may be readily devised by those skilled in the art which embody the principles of the present invention and fall within its spirit and scope.

What is claimed is:

1. A method for transmitting a multiplicity of messages over a plurality of Collision-type lines interconnecting numerous synchronized stations, wherein each message is generated by a corresponding station and is partitioned into a number of bit intervals, and wherein a Collision-type line propagates a composite logic level having: a logic zero level whenever no station transmits a logic one bit; a logic one level whenever only one station transmits a logic one bit; and a logic two level whenever two or more logic one bits are transmitted over the line by the stations, the method for any arbitrary bit interval comprising the steps of assigning available ones of the lines to corresponding ones of the stations, broadcasting a logic level by each of the stations over a corresponding one of its assigned lines to produce a composite logic level on each line, detecting the composite logic level on each line by all the stations, for each line having a composite logic one level and thereby identifying a unique message, assigning only the station generating said unique message with said corresponding one of its assigned lines for the remaining bit intervals, and identifying those lines not propagating a unique message as available for subsequent assignment during operation of the method following said arbitrary bit interval, wherein said composite level on each line after the last bit interval determines successfully transmitted messages.

2. The method as recited in claim 1 wherein said step of assigning includes the step of initially associating each of the lines with corresponding ones of the stations based on the content of the messages in a preselected number of initial bit intervals.

3. The method as recited in claim 2 wherein said preselected number of initial bits is designated N and N satisfies the inequality $2^N \leq L$, where L is the number of lines.

4. The method as recited in claim 1 wherein said step of detecting includes the step of assigning each line a status of Idle, Unique or Collision depending upon the level of said composite signal, and said step of identifying includes the step of marking said Idle and Collision lines as available.

5. A method for transmitting a multiplicity of messages over a plurality of Collision-type lines interconnecting numerous synchronized stations, wherein each message is generated by a corresponding station and is partitioned into a number of bit intervals, and wherein a Collision-type line propagates a composite logic level having: a logic zero level whenever no station transmits a logic one bit; a logic one level whenever only one station transmits a logic one bit; and a logic two level whenever two or more logic one bits are transmitted over the line by the stations, the method comprising the steps of (a) based on a preselected number of initial message bits, propagating a logic level by each of the stations over a corresponding one of the lines to produce a composite logic level and detecting by all stations the composite logic level on each line, (b) for each line having only one detected message and thereby determining a uniquely transmitted message, broadcasting the unique message by the associated station over the corresponding line for the remainder of the bit intervals and monitoring by all stations to detect the uniquely transmitted message, for each bit interval after said initial bits, (c) assigning available ones of the lines to corresponding ones of the stations, (d) broadcasting a logic level by each of the stations over a corresponding one of its assigned lines, (e) detecting the composite level on each line by all the stations, (f) for each line propagating a composite logic one level and thereby determining a unique message, branching to step (b), and (g) identifying those lines not propagating a unique message as available for subsequent assignment during operation of the method following said arbitrary bit interval and branching to step (c), wherein said composite level on each line after the last bit interval determines successfully transmitted messages.

6. A method for transmitting a multiplicity of messages partitioned into frames over a plurality of Collision-type lines interconnecting numerous synchronized stations, wherein each message frame is generated by a corresponding station and is partitioned into a number of bit intervals, and wherein a Collision-type line propagates a composite logic level having: a logic zero level whenever no station transmits a logic one bit; a logic one level whenever only one station transmits a logic one bit; and a logic two level whenever two or more logic one bits are transmitted over the line by the stations, logic one bits transmitted over the line by the stations the method comprising the steps of (a) based on a preselected number of bit intervals for the messages in each frame, broadcasting a logic one level by each of the stations over a corresponding one of the lines in correspondence to the content of the messages in said preselected number of bit intervals and detecting the composite logic level on each line by all stations to determine the initial status of each line, (b) for each line having a detected composite logic one level, assigning each said line a unique (U) status so as to identify a unique message, and associating the station generating said detected composite logic one level with the corresponding line for the duration of the propagating message frame and monitoring by each of the stations for the unique message transmitted over said corresponding line, (c) for lines having either a detected composite logic zero level defining an Idle (I) status or a detected composite logic two level defining a Collision (C) status, matching C and I lines in top-down order, (d) for each pair of matched lines, broadcasting by each of the matched stations a logic one level on the matched C line if the next message bit from each matched station is a logic one or a logic one level on the matched I line if the next message bit from each matched station is a logic zero, and detecting the composite level on each matched line by all station to determine the present status of each matched pair, (e) for each unmatched line, broadcasting by each of the unmatched stations either a logic one level or a logic zero level as determined by the next bit from each unmatched station and detecting the composite level on each matched line by all stations to determine the present status of each unmatched line, and (f) branching to step (b) if the present status is Unique or repeating steps (c)-(e) is the present status if Idle or Collision for each of the lines, wherein the bit patterns detected on each of the lines by the end of each of said frames determine successfully transmitted messages.

7. A method for communicating among synchronized station messages emitted by the stations, the messages being partitioned into a number of bit intervals, the method comprising the steps of interconnecting the stations with a plurality of lines supporting Collision-type propagation by the stations, wherein a Collision-type line propagates a composite logic level having: a logic zero level whenever no station transmits a logic one bit; a logic one level whenever only one station transmits a logic one bit; and a logic two level whenever two or more logic one bits are transmitted over the line by the stations, and for each given bit interval
- assigning available ones of the lines to corresponding ones of the stations,
- broadcasting a logic level by each of the stations over a corresponding one of its assigned lines,
- detecting the composite logic level on each line by all the stations,
- for each line propagating a composite logic one level and thereby determining a unique message, assigning only the station generating said unique message with said corresponding one of its assigned lines for the remaining bit intervals, and
- identifying those lines not propagating a unique message as as available for subsequent assignment during operation of the method following said bit interval, wherein said composite level on each line after the last bit interval determines successfully transmitted messages.

* * * * *

UNITED STATES PATENT AND TRADEMARK OFFICE
CERTIFICATE OF CORRECTION

PATENT NO. : 4,899,143

DATED : Feb. 6, 1990

INVENTOR(S) : Bhaskarpillai Gopinath et al

It is certified that error appears in the above-identified patent and that said Letters Patent is hereby corrected as shown below:

Column 4, line 4, change "$S^1$" to --$S_1$--.

Column 6, line 1, after "to" insert --broadcast--.

Signed and Sealed this

Twenty-first Day of July, 1992

Attest:

DOUGLAS B. COMER

*Attesting Officer*    *Acting Commissioner of Patents and Trademarks*